(No Model.)  3 Sheets—Sheet 1.
W. H. ELLIOT.
MAGAZINE FIRE ARM.
No. 258,731.  Patented May 30, 1882.
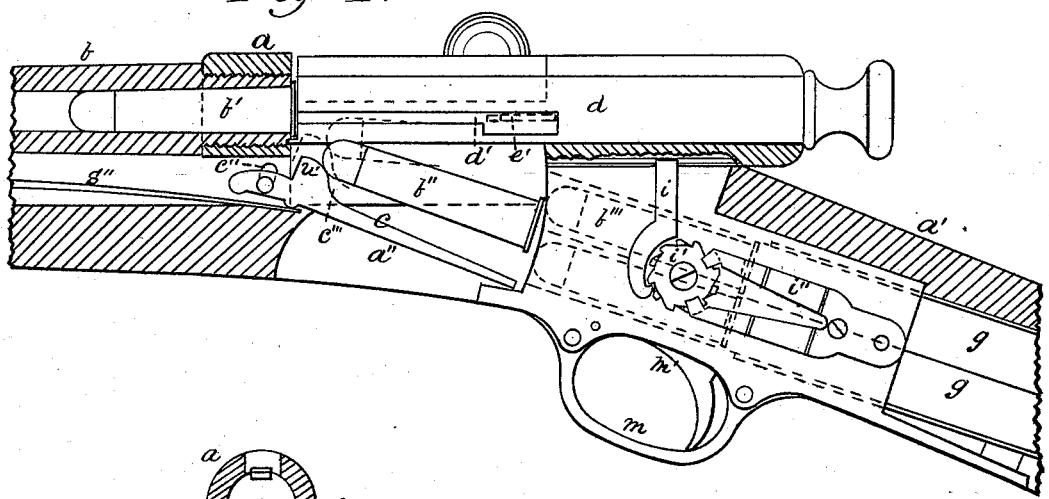
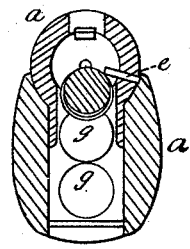
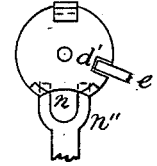
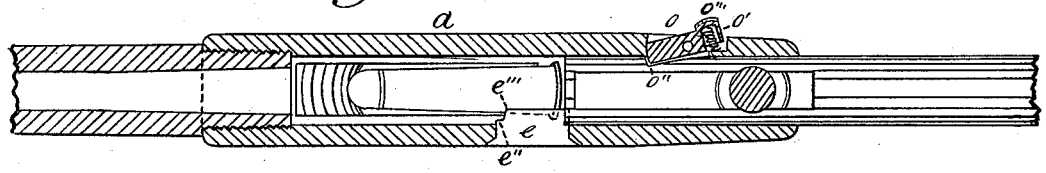
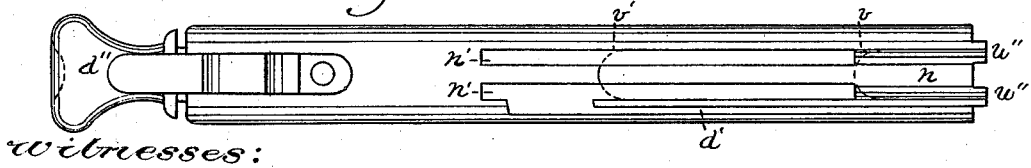
Witnesses:
Inventor:

(No Model.) 3 Sheets—Sheet 2.

W. H. ELLIOT.
MAGAZINE FIRE ARM.

No. 258,731. Patented May 30, 1882.

Witnesses:
D. Lewis
Geo. D. Richardson

Inventor:
Wm. H. Elliot

N. PETERS. Photo-Lithographer. Washington, D. C.

(No Model.)  3 Sheets—Sheet 3.
W. H. ELLIOT.
MAGAZINE FIRE ARM.
No. 258,731. Patented May 30, 1882.
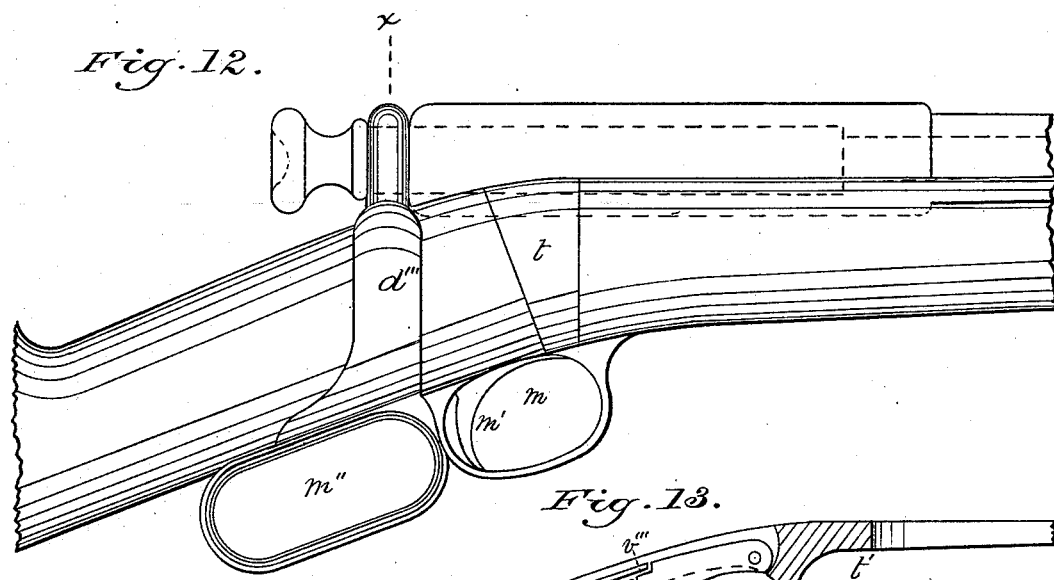
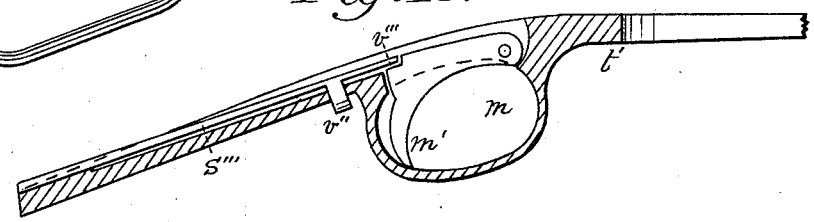
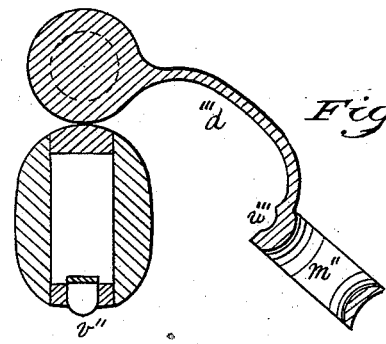
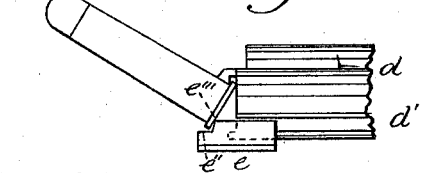
Witnesses:
Inventor:

UNITED STATES PATENT OFFICE.

WILLIAM H. ELLIOT, OF NEW YORK, N. Y.

MAGAZINE FIRE-ARM.

SPECIFICATION forming part of Letters Patent No. 258,731, dated May 30, 1882.

Application filed February 21, 1882. (No model.)

*To all whom it may concern:*

Be it known that I, WM. H. ELLIOT, of New York, county of New York, and State of New York, have invented a new and Improved Magazine Fire-Arm, of which the following is a specification.

The object of my invention is to provide a more convenient, simpler, and more practical fire-arm than any now in use; and the nature of my invention consists in the use of certain appliances and methods, which are set forth in the following specification and claims.

Figure 6:
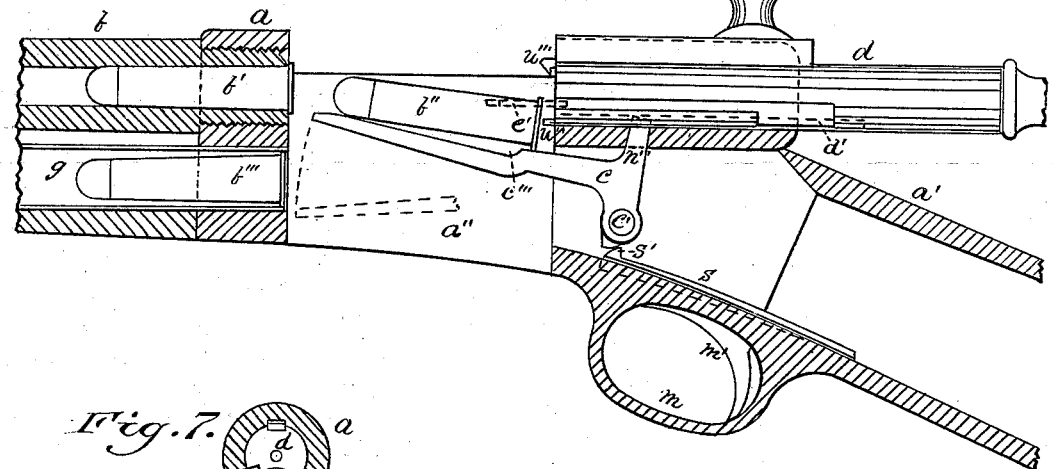
Figure 7:
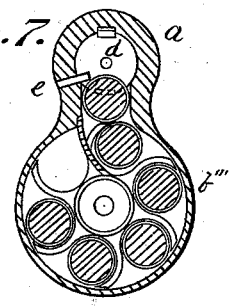
Figure 8:
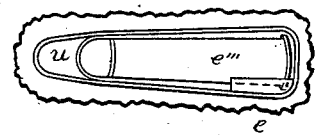
Figure 9:
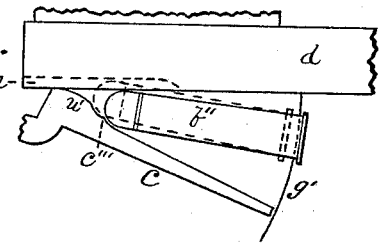
Figure 10:
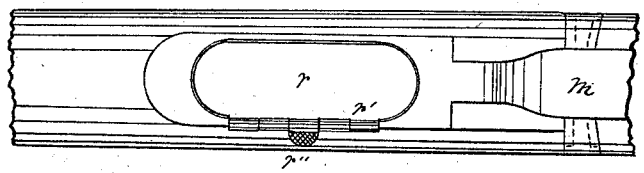
Figure 11:
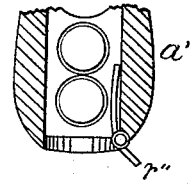

Figure 1 is a vertical longitudinal section of my improved arm, showing the feeding devices in elevation. Fig. 2 is a vertical cross-section of the same. Fig. 3 is an elevation of the forward end or face of the bolt. Fig. 4 is a horizontal section of the arm in the axis of the bolt, showing a plan of the bolt. Fig. 5 is a view of the under side of the bolt. Fig. 6 is a vertical longitudinal section of an arm having the magazine located under the barrel, and showing the application to such an arm of my invention. Fig. 7 is a cross-section of a revolving magazine arm, showing the application of a portion of my invention to such an arm. Fig. 8 is a plan of the mouth of a detachable magazine, showing a part of my invention applied to such an arm. Fig. 9 is an elevation of a bolt, cartridge, and carrier. Fig. 10 is a view of the lower side of the arm, showing the cover of the opening for charging the magazine. Fig. 11 is a cross-section, showing the same. Fig. 12 is an elevation of the arm. Fig. 13 is a vertical section of the guard-strap, showing devices for locking the handle. Fig. 14 is a vertical cross-section of the bolt, handle, and wrist of the arm at open line $x$, Fig. 12. Fig. 15 is an elevation of the ejecting devices.

The invention herein described refers to that kind of arm in which the bolt or breech-block has a reciprocating movement in a line with the barrel for opening and closing the chamber, and is an improvement upon the arm secured to me by patent dated July 13, 1880, and upon an arm represented in an application now pending before the Commissioner of Patents, to which, for the better understanding of this specification, I desire to call special attention.

In the drawings I have shown the application of my invention to several kinds of magazine-arms; but the one I prefer is represented in Figs. 1 and 2, in which, for a magazine, I employ two or more tubular chambers, each containing independent cartridge-propelling devices, which are located in the butt-stock of the arm, and arranged one over the other. The magazine is also provided with alternate feeding devices, as shown and described in said pending application, except that a double-spring feed-pawl is herein shown in place of two feed-pawls and a double spring.

The upper end of revolving pawl $i$ is bent inward, and works in a longitudinal groove cut in the side of the bolt, and when the bolt is rotated to the right in locking it it gives a vertical movement to the pawl, which causes the disk or ratchet $i'$ to revolve one notch. On the face of the disk, over each alternate ratchet-tooth, there is a cam. These cams and the free ends of the double feed-pawl $i''$ are so arranged in relation to each other that the cams pass under the ends of the feed-pawl alternately. Each time one of the ends of the feed-pawl is raised the line of cartridges under it is permitted to move forward until the ball of the first cartridge lodges in the recess $c'''$, between the carrier and bolt. In this position of parts the head of the cartridge remains a little way in the magazine. The bolt has on its lower side, or side opposite to the handle, a shallow groove, $n$, which is turned to one side while the arm is locked; but when the arm is unlocked, by turning the bolt to the left, the groove $n$ is brought directly over the cartridge on the carrier, and the magazine-spring, still acting upon the cartridge, moves it forward, as shown in Fig. 9, from the position indicated by full lines to that indicated by open lines, the object being to free the cartridge from the magazine entirely while the carrier is still held down by the bolt, so that the carrier cannot interfere with the movement of the cartridge while it is leaving the magazine. The groove or recess $n$ serves to hold the cartridge in a central position when the bolt is drawn back, and is equivalent to a recess upon the carrier, the bolt and carrier being so arranged as to take the shock of arresting the movement of the cartridges before the feed-pawl engages the head of the second cartridge in the magazine.

In Fig. 6 the same features are exhibited, and with the same advantages. As the cartridges are released from the magazine under the barrel the whole column moves backward until the head of the first cartridge lodges in the recess $c'''$ on the carrier and against the under side of the bolt. When the bolt is rotated to the left to unlock it the head of the cartridge falls into the groove $n$, when it is immediately forced back by the magazine-spring entirely free from the magazine, before the carrier can be moved by the bolt. In this case the movement of the carrier is positive, being actuated by its forked arm $n''$ working in the grooves $n'$ in the lower side of the bolt. In either case the shock of arresting the movement of the column of cartridges is taken upon the carrier and bolt; but it is immediately allowed to move on until the feed-pawl engages the head of the second cartridge and before the carrier commences its upward movements.

By reference to Fig. 1 it may be seen that the pivot $c''$ of the carrier has an oblong bearing in the receiver, which allows the forward end of the carrier to be depressed against the spring $s''$. The object of this feature is to cushion to some extent the blow of the moving column of cartridges when they strike the carrier and bolt and to provide room over the cam $u'$ for a cartridge when using the arm as a double breech-loader with the magazine reserved. In this case the first cartridge is inserted into the chamber of the barrel and the second placed on the carrier, and it is only necessary to depress the rear end of the cartridge in the receiving-chamber by the index-finger of the right hand, when the bolt may be pushed forward and locked, the forward end of the cartridge and carrier yielding in a downward direction to the pressure of the bolt from the position represented by broken lines to that represented by full lines. The oblong pivot-bearing may be either in the receiver or in the carrier and serve the same purpose.

In several of the figures my improved ejector and stop $e$ is represented, which, in Fig. 4, is shown to be a plate put through the side of the receiver and projecting into the receiving-chamber far enough to reach the body of the cartridge, and effectually arrests its further upward or lateral movement, as shown in Fig. 2, and in Fig. 8 it is represented as being attached to a detachable magazine instead of the receiver, in which case, in addition to its other functions, it holds the cartridges in the magazine while detached from the arm. In the receiving-chamber this device presents the appearance of a rib, located a little below the center and extending from the rear end of the chamber forward for a distance equal to about one-fourth of the length of the cartridge used. This projecting rib is arranged parallel, or nearly so, with the line of the barrel; but as the cartridge is raised by the carrier higher at its forward end than at its rear end, the extreme forward end of the rib only touches the body of the cartridge. To make room for this rigidly-projecting rib the bolt has to be provided with the groove $d'$, which is extended forward through the face of the bolt, as shown in Fig, 3, and is widened at its rear end to allow the bolt to be rotated in locking it; and, to prevent the head of the cartridge from falling behind the rib or between it and the end of the bolt, it should extend back into or near to the end of the bolt when that device is fully drawn back.

The immediate propelling device which gives lateral movement to the cartridge, whether it be a carrier, a follower, or the radial arms of a rotating magazine, must communicate its force to the two extreme ends of the cartridge, so that when the cartridge reaches the stop it will be firmly held by the propelling device below pressing upon the two ends and the rib or stop above pressing upon a point between the two ends, and can be released from these devices only by the forward or parallel movement imparted to it by the bolt. By "immediate propelling device" I mean that one of the several propelling devices which is immediately in the rear of the advancing cartridge, and which carries the cartridge from the mouth of the magazine to the receiving-chamber. This device, whether it be actuated by positive or spring movement in performing its simple function, is a carrier.

In Fig. 8, the carrier $u$ is actuated directly by the spring under it, and it applies its force to the cartridge both in rear and in front of the forward end of the stop $e$, as shown in Fig. 6. The bolt must also be provided with the lip or lips $u''$, between which and the extractor $u'''$ the shell of the cartridge is held while being extracted. The shell in being drawn back by the bolt moves over the surface $e''$, Figs. 4 and 15, and is ejected by the point $e'''$ or forward end of the rib. The surface $e''$ holds the head of the shell up to the extractor after the lips $u''$ on the bolt have released it. Two ejector and stop ribs may be used, if desired, one upon each side of the receiving-chamber, and they may be supported directly by the receiver or by some device attached to the receiver. In combination with this stop and ejector-rib $e$, I prefer to use a carrier which is held up by a spring, as in that case the carrier will yield downward to allow the head of the cartridge room to pass forward under the rib, but will rise again after the head has passed the rib to bring the cartridge nearer into line with the barrel. It may, however, be used with a carrier which is locked or rigidly held up by cutting away the top of the carrier, as seen in Fig. 6, so as to make room for the head of the cartridge to pass under the rib without depressing the carrier.

In Fig. 10, it may be seen that the cover $r$ of the charged opening is hinged at $r'$ to an extension of the guard-strap, and is provided with a thumb-piece, $r''$. This cover opens inward, and is so constructed that the thumb-piece lies flat upon the arm when closed, but projects when open, as shown in Fig. 11. The cover may be held closed, or both open and closed, by a spring.

The stop-pawl $o$ limits the backward movement of the bolt by falling into the notch $o''$ cut in the bolt, being actuated by the spring $o'$, and operated to release the bolt from the receiver by the thumb-piece $o'''$.

In Fig. 12 it may be seen that the handle of the bolt $d'''$ is rigidly fixed to the rear end of the bolt, and extends downward by the side of the arm and terminates in a loop, $m''$, under the wrist and directly in the rear of the guard. The arm is opened by swinging the handle out, as shown in Fig. 14, and then drawing it directly back. In closing the arm these movements are reversed. When the handle is moved back to its place the projection $v''$ on spring $s'''$ falls into the recess $u'''$, which acts as a friction-catch to hold the handle in place. The spring $s'''$ extends forward over the rear end of the trigger, as seen at $v'''$. When the projection $v''$ is in the recess $u'''$ the forward end of the spring is held up so as to allow the trigger movement enough to trip the hammer; but when the handle is swung out and the bolt unlocked the spring $s'''$ rests upon the rear end of the trigger, and so prevents it from being operated until the handle is locked in place. The handle need not necessarily terminate in a complete loop under the wrist of the arm; it may be constructed in the form of three rings. It should, however, be suited to the shape and position of the hand, so that the operator may apply force in the several directions without inconvenience or discomfort. By this construction and arrangement of the handle of the bolt I bring the grip or end of the handle, whatever its form may be, under one or more of the fingers, which grasp the wrist of the arm, and by which the bolt is operated, the trigger being operated by the index-finger, while the thumb rests upon the wrist. During the manipulation of the arm all parts of the hand retain their relative positions, and are not, therefore, liable to mistakes in working the devices.

The extreme forward end of the rib or point $e'''$ serves the double purpose of stop and ejector, and to be effectual it must be arranged in relation to the other parts as follows: As a stop it must touch the body of the cartridge at a point far enough forward of the head so that the force of the immediate propelling device will be applied to the opposite side of the cartridge in the rear of the said point as well as in front of it, and in such proportionate force that the cartridge will be held balanced on said point in a position as near as may be in a line with the barrel. As an ejector the point $e'''$ must be arranged far enough from the rear end of the barrel to allow a whole cartridge to swing out from the receiving-chamber turning upon said point.

Having described my invention, what I desire to have secured to me by Letters Patent of the United States is—

1. In a magazine fire-arm, the combination of devices substantially as follows: a bolt which moves in a line with the barrel for closing the chamber, and is provided with groove $d'$, which extends forward through the face of that device for the reception of the stop $e$ when the arm is closed, a stop rigidly fastened to the receiver or to some device supported by the receiver, which projects unyieldingly into the receiving-chamber and touches the body of the cartridge at a point forward of its head to stop its upward or lateral movement, and a carrier which applies its force to the cartridge both in rear and in front of said stop, substantially as specified.

2. In a magazine fire-arm, the combination of devices substantially as follows: a bolt which moves in a line with the barrel for closing the chamber, and is provided with groove $d'$, which extends forward through the face of that device for the reception of the stop and ejector $e$ when the arm is closed, and is also provided with an extractor, $u'''$, a stop and ejector rigidly fastened to the receiver or to some device supported by the receiver, which projects unyieldingly into the receiving-chamber and touches the body of the cartridge at a point forward of its head to stop its upward or lateral movement, and is located at a proper distance from the rear end of the chamber of the barrel to serve as an ejector of the shell, and a carrier which applies its force to the cartridge both in rear and in front of said stop and ejector, whereby this device serves the double purpose of stopping the advancing cartridge before the bolt and of ejecting the empty shell from the arm, substantially as specified.

3. In a magazine fire-arm, a tubular magazine located in the butt-stock, a bolt or breech-block for closing the chamber, which moves in a line with the barrel, and in combination therewith a carrier pivoted to the receiver under, or nearly under, the rear end of the barrel by means of an oblong pivot-bearing, $c''$, and with spring $s'''$, said bearing being oblong in a vertical direction, so that it yields downward to cushion the force of the advancing column of cartridges or to make room for a cartridge in the receiver between the carrier and the bolt when the arm is closed, substantially as specified.

4. In a magazine fire-arm having a bolt for closing the chamber provided with a handle which terminates under the guard-strap, and in combination therewith, a spring, $s'''$, provided with the catch $v''$, and an extension, $v'''$, which projects over the rear end of the trigger, whereby the trigger is only allowed movement enough to trip the hammer when the handle is locked in place, substantially as specified.

5. In a magazine fire-arm having a bolt or breech-block for closing the chamber, which moves in a line with the barrel, and is provided with groove $n$, for holding the cartridge in a central positon, and in combination therewith a carrier which holds the end of the cartridge in said groove, substantially as shown and described.

WM. H. ELLIOT.

Witnesses:
 D. LEWIS,
 GEO. D. RICHARDSON.